No. 720,427. PATENTED FEB. 10, 1903.
J. HENDERSON.
WINDMILL.
APPLICATION FILED JUNE 2, 1902.
NO MODEL.
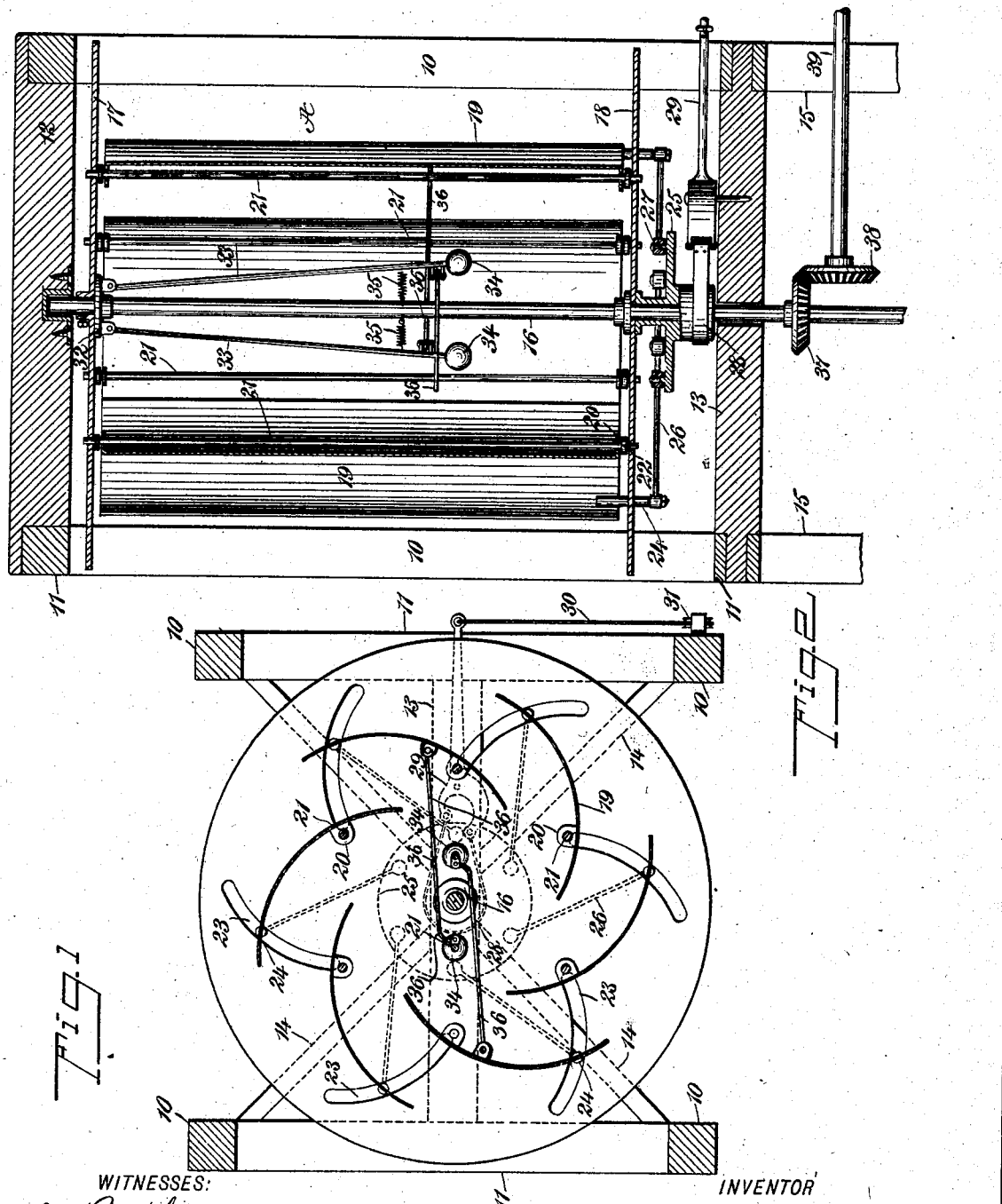
WITNESSES:
INVENTOR
John Henderson
BY
ATTORNEYS.

UNITED STATES PATENT OFFICE.

JOHN HENDERSON, OF MILLGROVE, MISSOURI.

WINDMILL.

SPECIFICATION forming part of Letters Patent No. 720,427, dated February 10, 1903.

Application filed June 2, 1902. Serial No. 109,916. (No model.)

*To all whom it may concern:*

Be it known that I, JOHN HENDERSON, a citizen of the United States, and a resident of Millgrove, in the county of Mercer and State of Missouri, have invented a new and Improved Windmill, of which the following is a full, clear, and exact description.

The purpose of my invention is to provide a simple and economic form of windmill in which the wings are vertically placed, transversely curved, and pivoted at their ends in a circular group, one wing overlapping the other.

Another purpose of the invention is to provide means for limiting the movement of the wings and a governor constituting a portion of the wheel and located within the circle of wings, which governor regulates the speed of the wheel by regulating the extent to which the wings shall open, and, furthermore, to provide a simple means for stopping the wheel by completely closing the wings one upon the other.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a transverse section through the wheel and frame looking downward, and Fig. 2 is a vertical section through the wind-wheel and the frame in which it is mounted.

The frame in which the wheel A is mounted consists of corner-posts 10 and upper and lower connecting-beams 11 at opposite sides, central and outer bridge-beams 12 at the top of the structure, and a lower central beam 13, having suitable braces 14, as is shown in Fig. 1. This frame is supported any suitable distance above the ground by braced uprights 15. The drive-shaft 16 is journaled at its upper end in bearings in the central bridge-beam 12 and passes loosely through the lower cross-beam 13 and through a suitable bearing at its lower end. The wheel A is secured to the shaft 16 within the frame just described, and this wheel primarily consists of upper and lower heads 17 and 18 and wings 19, circularly grouped around the shaft and pivoted in the said heads. The wings 19 are curved in cross-section, their inner faces being concaved and their outer faces convexed. Each wing at its top and bottom is provided nearer its inner longitudinal edge than its outer longitudinal edge with lugs 20, and pivot-rods 21 are passed through the said lugs into the heads 17 and 18 of the wheel, being provided between the ends of the wings and the heads with suitable washers 22, as is shown in Fig. 2. These wings are so grouped that they overlap and may be closed one wing closely upon the other, thereby concealing the shaft 16 and preventing the wind from having any action on the wings.

The upper and lower heads of the wheel A are secured to the shaft 16 by set-screws or their equivalents, and in the bottom head 18 of the wheel a series of eccentrically-grouped curved slots 23 is produced, the slots being curved in a reverse direction to the curvature of the wings 19, as is shown in Fig. 1, and the said wings, near their outer edges, cross the said slots. Each wing 19 is provided with a stud 24, which extends down from its lower edge through one of the curved slots 23 in the said lower head of the wheel.

Just below the lower head 18 of the wind-wheel a disk-wheel 25 is loosely mounted on the said shaft 16 above the lower cross-beam 13, as is best shown in Fig. 2, and connecting-bars 26 are pivotally attached to the lower end of each stud 24 and to pins 27, which extend from the upper face of the wheel 25. A strap-brake 28 is made to engage with the hub of the wheel 25, which strap-brake is operated by a suitable lever 29, fulcrumed upon the lower cross-beam 13, and a rope, chain, or cord 30 is attached to the outer end of this lever and extends down over a suitable pulley 31 to within reach of the ground. This wheel 25 is practically a brake-wheel, as when the strap-brake 28 is applied to the said wheel 25 and it is held stationary the action of the wind upon the open wings will be to close the said wings closely one upon the other, bringing the studs 24 to the inner ends of the slots 23 in the lower head 18 of the wind-wheel; but when the wheel 25 is released from the brake 28 this wheel is free to turn upon the shaft 16, and consequently the wind when striking the concaved faces of the wings 19 can force the wings outward until the studs 24 reach the outer ends of the slots 23. The governor holds the wings in position to catch the wind when the brake is thrown.

In order that the wheel shall not race in high winds, a governor is provided for said wheel. This governor consists of a disk 32, which is secured to the shaft 16 at the upper head 17 of the wheel, and opposing arms 33, which are pivoted at their upper ends to the said disk 32 and extend downward, one at each side of the shaft 16, for a predetermined distance, having balls 34 at their lower ends, and near the lower ends of the governor-arms 33 said arms are connected with the shaft 16 by means of springs 35, which offer some resistance to the outward movement of the governor-arms, so that the governor will not act except under the influence of a high wind.

When the governor-arms 33 are carried outward by centrifugal motion, they cause the wings 19 to partially or completely close through attaching the governor-arms, near their weighted ends, to the inner faces of opposing wings 19 through the medium of connecting-bars 36, which bars are pivotally attached to the governor-arms and to the wings. The lever 29 is provided with a forked head and is eccentrically pivoted, as is shown in Fig. 1, and the shaft 16, turned by the wind-wheel A, is shown provided with a beveled gear 37 attached thereto, meshing with a second bevel-gear 38, carried by a shaft 39, by which power is to be transmitted. This wind-wheel is very efficient in operation. It is simple, durable, and economic in construction, and may be almost instantly stopped upon the application of the brake 28, as has been described.

Having thus described my invention, I claim as new and desire to secure by Letters Patent—

1. In a windmill, a shaft, a support for the shaft, a wheel secured to the shaft, which wheel consists of upper and lower heads, the lower head being provided with series of eccentrically-curved slots, and a series of circularly-grouped wings pivoted between their centers and inner edges in the said heads, projections from the wings, extending through the said slots, a controlling-wheel loosely mounted upon the shaft below the wind-wheel, connecting-rods pivoted to the extensions from the wings and to the said controlling-wheel, and a brake for the said wheel, substantially as described.

2. In a windmill, a shaft, a support therefor, a wind-wheel secured to the shaft, said wind-wheel consisting of upper and lower heads, the lower heads having series of eccentrically-located slots therein, and a series of wings curved in cross-section, having their inner faces convexed, which wings are pivoted between their centers and inner edges at top and bottom to the corresponding heads of the wind-wheel, the said wings being circularly grouped and arranged to overlap, extensions from the outer end portions of the wings, extending through the slots in the lower head of the wind-wheel, a regulating-wheel loosely mounted on said shaft below the wind-wheel, connecting-bars pivotally attached to said regulating-wheel and to said extensions from the wings, and a brake for the regulating-wheel, substantially as described.

3. In a windmill, a shaft, a support therefor, a wind-wheel secured to the shaft, said wind-wheel consisting of upper and lower heads, the lower heads having series of eccentrically-located slots therein, and a series of wings curved in cross-section, having their inner faces convexed, which wings are pivoted between their centers and inner edges at top and bottom to the corresponding heads of the wind-wheel, said wings being circularly grouped and arranged to overlap, extensions from the outer end portions of the wings, extending through the slots in the lower head of the wind-wheel, a regulating-wheel loosely mounted on said shaft below the wind-wheel, connecting-bars pivotally attached to said regulating-wheel and to the said extensions from the wings, a brake for the regulating-wheel, governor-arms pivotally attached to the said shaft within the said wind-wheel, and rods connecting the said governor-arms with opposing wings near their inner edges, as described.

In testimony whereof I have signed my name to this specification in the presence of two subscribing witnesses.

JOHN HENDERSON.

Witnesses:
GEORGE W. ORTH,
J. W. BUTCHER.